US006244950B1

(12) United States Patent
Long et al.

(10) Patent No.: US 6,244,950 B1
(45) Date of Patent: Jun. 12, 2001

(54) AUTOMATIC SKIN REMOVAL AND FAT TRIMMING DEVICE FOR MEAT PRODUCTS

(76) Inventors: John W. Long, 1003 S. 24th St., Omaha, NE (US) 68108; Ryan McGill, 4208 Mayberry St., Omaha, NE (US) 68105; Joe LaFave, 2424 Hickory Ave, Omaha, NE (US) 68108; Aaron Borns, 136 N. 40th St., Omaha, NE (US) 68131; Rick Merrill, 2650 6th Ave., Council Bluffs, IA (US) 51501

( * ) Notice: Subject to any disclaimer, the term of this patent is extended or adjusted under 35 U.S.C. 154(b) by 0 days.

(21) Appl. No.: 09/465,092

(22) Filed: Dec. 16, 1999

(51) Int. Cl.[7] ............................. A22C 17/12; A22B 5/16
(52) U.S. Cl. ............................. 452/127; 452/136
(58) Field of Search ................................. 452/127, 125, 452/134, 136

(56) References Cited

U.S. PATENT DOCUMENTS 2,715,427 * 8/1955 Townsend ........................ 452/127
3,529,318 * 9/1970 Jobmann ........................... 452/127
3,739,428 * 6/1973 Bartels et al. .................... 452/127
5,558,573 * 9/1996 Basile, II et al. ................. 452/127
5,738,577 * 4/1998 Long ................................. 452/127

* cited by examiner

Primary Examiner—Willis Little
(74) Attorney, Agent, or Firm—Adam H. Jacobs (57) ABSTRACT

An automatic skin removal and fat trimming device includes an entry conveyor belt and a forward section of an upper pressing conveyor belt which cooperate to move the meat product into contact with a rotating ridged cylinder which in turn forces the meat product into contact with a skin removal blade mounted adjacent the end of the entry conveyor belt and a second curved fat trimming blade then engages the meat product, the fat trimming blade positioned above the skin trimming blade and spaced therefrom to engage, cut and remove the fat lining surrounding the meat on the meat product, following which a meat removing conveyor belt mounted rearwardly of the skin trimming and fat trimming blades engages the meat product thus removing the meat product from the trimming device in cooperation with a rear section of the upper pressing conveyor belt which compresses and pulls the meat product through the device.

7 Claims, 8 Drawing Sheets

AUTOMATIC SKIN REMOVAL AND FAT TRIMMING DEVICE FOR MEAT PRODUCTS

BACKGROUND OF THE INVENTION

1. Technical Field

The present invention relates generally to an apparatus for automatically removing the skin and trimming fat from a meat product and, more particularly, relates to an automatic skin removal and fat trimming device including an entry conveyor belt and an upper pressing conveyor belt which cooperate to move the meat product into contact with a rotating ridged cylinder which in turn forces the meat product into contact with a skin removal blade mounted adjacent the end of the entry conveyor belt, a second curved fat trimming blade then engages the meat product, the fat trimming blade positioned above the skin trimming blade and spaced therefrom to engage, cut and remove the fat lining surrounding the meat portion of the meat product, following which a meat removing conveyor belt mounted rearwardly of the skin trimming and fat trimming blades engages the meat product thus removing the meat product from the trimming device in cooperation with the rear section of the upper pressing conveyor belt which compresses and pulls the meat product through the device.

2. Description of the Prior Art

Prior art devices for trimming unwanted portions from meat products are well known in the art. However, these devices are generally limited to meat products which are generally flat and may have the undesirable characteristic when used with rounded meat products, of pivoting or skewing the product during trimming.

Consequently, the trimming of an unwanted portion from a generally rounded product such as, but not limited to, beef and pork butts and the like, had to be accomplished by hand either using a knife such as described in Dubors, U.S. Pat. No. 5,025,175 and Townsend, U.S. Pat. No. 4,996,753 or a manual membrane skinning machine. These methods are extremely dangerous and/or time-consuming. Repetitive motion injuries, carpal tunnel problems, hand fatigue and lacerations are all possibilities resulting from hand skinning.

Furthermore, a problem with those devices in the prior art is that there does not exist a single device which will both deskin and defat the meat product automatically. This results in the need for additional machine operators and additional opportunities for injuries to the operator or ruination of the meat product.

As is well understood in the art, pork butts are also commonly referred to as pork shoulders. Additionally, meat "muscles" or "products" as used herein are meant to refer broadly to beef and pork butts such as sirloin butt, butt tenderloin, bottom sirloin butt, pork shoulder butt, boston butt and the like, but may include other types of meat products. Materials to be trimmed may be fat, membranes, skin, connective tissue, gristle, bone, or the like. Machines for accomplishing this trimming are referred to in the art as "skinning", "derinding", "defatting" or "trimming" machines.

Currently, extended, rounded meat products such as beef and pork butts, must usually be trimmed by hand or using machines with a feed mechanism which tend to pivot the product during the trimming process. Either way, it is difficult to properly trim the meat product, and both methods create the possibility of serious injury to the hands of the operator including cumulative trauma injuries and carpal tunnel injuries. Additionally, when using these prior art machines, there is a large reduction in efficiency due to the time required to perform the numerous hand strokes required. Furthermore, the numerous hand strokes required may lead to repetitive motion injuries. Consequently, it is highly desirable to automate the process of trimming extended or rounded meat products. Such automation leads to enhanced ergonomics, increased yield and increased production.

Therefore, an object of the present invention is to provide an improved automatic skin removing and fat trimming device for meat products.

Another object of the present invention is to provide an automatic skin removing and fat trimming device for meat products which is capable of automatically deskinning and trimming a variety of different sizes of beef or pork butts.

Another object of the present invention is to provide an automatic skin removing and fat trimming device for meat products capable of automatically keeping the meat product in proper position during the trimming process.

Another object of the present invention is to provide an automatic skin removing and fat trimming device which will accommodate a variety of blade shapes, sizes and types.

Finally, an object of the present invention is to provide an automatic skin removing and fat trimming device for meat products which is durable in construction and safe and efficient in use.

SUMMARY OF THE INVENTION

The present invention is directed to an automatic skin removal and fat trimming device for meat products which includes a frame having forward and rearward ends and an entry conveyor belt mounted on the frame adjacent to the forward end of the frame for receiving a meat product thereon and transporting it into the device. Mounted on the frame above the entry conveyor belt is an upper pressing conveyor belt which has forward and rearward sections, the forward section angled relative to the entry conveyor belt such that when a meat product on the entry conveyor belt is transported into the automatic skin removal and fat trimming device, the meat product is compressed between the entry conveyor belt and upper pressing conveyor belt in order to eliminate undesirable rotation of the meat product. The entry conveyor belt and upper pressing conveyor belt cooperate to move the meat product into contact with a rotating ridged cylinder mounted on the frame adjacent the rearward end of the entry conveyor belt, the cylinder operative to frictionally engage the skin of the meat product to further direct the meat product through the device and into contact with a skin removal blade mounted adjacent the end of the entry conveyor belt slightly above the plane of the entry conveyor belt such that as the meat product is moved past the skin trimming blade, the skin on the meat product is removed and separated from the remainder of the meat product. A separate curved fat trimming blade then engages the meat product, the fat trimming blade positioned above the skin trimming blade and spaced therefrom to engage, cut and remove the fat lining surrounding the meat on the meat product. A meat removing conveyor belt mounted rearwardly of the skin removal and fat trimming blades then engages the meat product and pulls the meat product towards the rearward end of the frame thereby removing the meat product from the trimming device. The rearward section of the upper pressing conveyor belt cooperates with the rear removal conveyor belt to compress and pull the meat product through the machine, in much the same manner as was done in connection with the entry conveyor belt and the forward section of the upper pressing conveyor belt. The meat product with the skin removed and fat separated from the meat is then ejected from the device by the meat removal conveyor belt. A drive device such as an electric motor is operatively connected to each of the conveyor belts by a serious of belts or chains to drive each of the conveyor belts to pull the meat product through the device and efficiently separate the skin and fat from the meat product.

As thus described, the present invention provides a substantial improvement over those devices found in the prior art. For example, because the skin and fat are removed during the same process, the overall processing time of the meat product is greatly reduced. Furthermore, the present invention eliminates the need for multiple machines and multiple persons to perform the skin removal and fat trimming operations, thus saving a user of the invention substantial costs and eliminating many of the risks previously discussed. Also, as the fat trimming blade of the present invention may be replaced with a fat trimming blade having a different curve, various types of meat products may be processed by the present invention, not only pork butts and the like. Finally, because the upper and lower conveyor belts cooperate to compress the meat product when the skin removal and fat trimming blades engage the meat product, the meat product will not slip or rotate, resulting in efficient cutting of the fat and skin. It is thus seen that the present invention provides a substantial improvement over those skin removal and fat trimming devices found in the prior art.

DESCRIPTION OF THE PREFERRED EMBODIMENT

Figure 1:
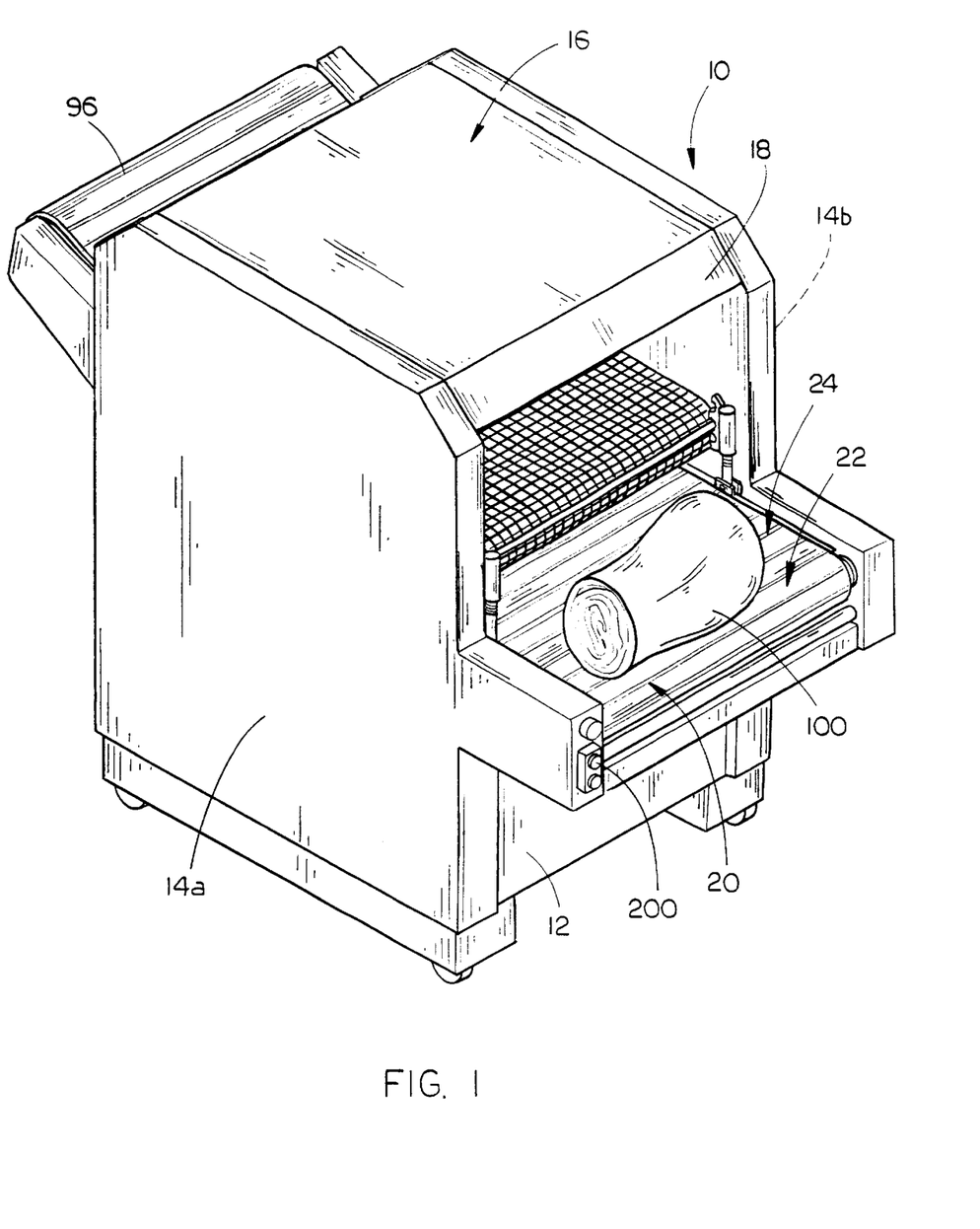
FIG. 1 is a perspective view of the automatic skin removal and fat trimming device of the present invention.
Figure 2:
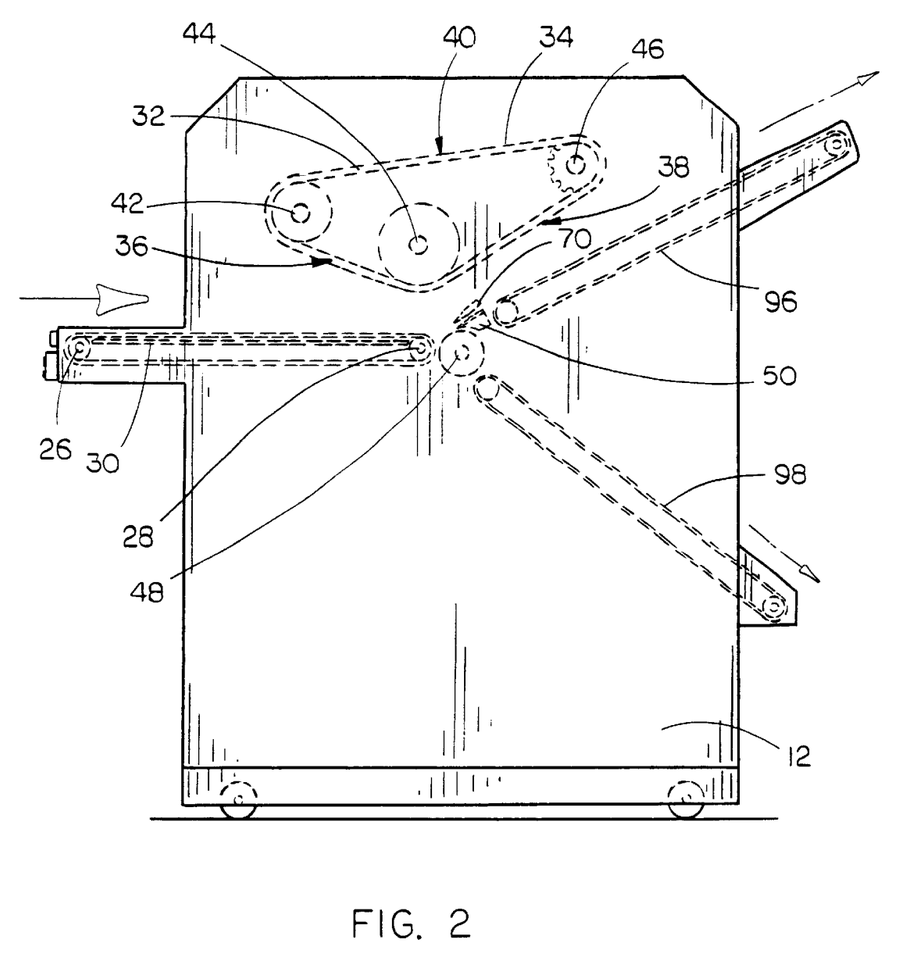
FIG. 2 is a side elevational view of the present invention showing the arrangement of the conveyor belts and trimming blades therein.

The automatic skin removal and fat trimming device 10 of the present invention is best shown in FIGS. 1 and 2 as including a generally rectangular frame and housing 12 having side walls 14a and 14b, a top lid 16 and a forward grate 18 which swings open to permit access to the interior of the device 10. It should be noted that the size and shape and overall design of the frame and housing 12 is not critical to the present invention so long as the various operative elements are supported in their desired positions and unintended contact with the internal elements of the invention is prevented, as will be set forth later in this disclosure.

Mounted on frame 12 adjacent the forward part thereof is an entry conveyor belt 20 which, in the preferred embodiment, includes a plastic or rubber belt 22 having a plurality of raised ridges 24 formed thereon for frictionally engaging the meat product 100 which is placed on the belt 22. The belt 22 extends around a forward roller 26 and around a drive roller 28 positioned towards the middle of frame 12 which supports the belt 22 in a generally horizontal position, as shown best in FIG. 2. It is preferred that the carrying section of the belt (the upper belt surface) be supported by a steel plate 30 mounted on frame 12 directly underneath the carrying portion of the belt 22 in order to prevent the deformation of the belt 22 when the meat product 100 is placed thereon, although it should be noted that any appropriate underbelt support structure could be used so long as the belt cannot deform under stress. Referring to FIG. 2, it is seen that the entry conveyor belt 20 rotates in a clockwise direction in order to feed the meat product 100 into the automatic skin removal and fat trimming device 10.

As the meat product 100 enters the device 10 on belt 22, the topmost section of the meat product 100 contacts the forward section of the upper pressing conveyor belt 32, which is best shown in FIGS. 1 and 2. In the preferred embodiment, the upper pressing conveyor belt 32 will be constructed of a metal mesh or grate, preferably stainless steel, which would be durable in nature yet relatively simple to clean. As shown in FIG. 2, the belt 34 is supported in a generally triangular shape and can be viewed as having three sections, a forward meat-engaging section 36, a rearward meat-engaging section 38, and a return section 40. The belt 34 is supported by at least three rollers, a forward roller 42, lower roller 44 and a drive roller 46, each of which would preferably include projecting fingers to engage the mesh holes of belt 34. Upper pressing conveyor belt 32 would preferably rotate in a counter-clockwise direction and the belt 34 of the upper pressing conveyor belt 32 would preferably move at the same speed as belt 22 on entry conveyor belt 20. The upper pressing conveyor belt 32 is designed to cooperate with the entry conveyor belt 20 to engage and press the meat product 100 in the following manner. As the meat product 100 is moved into the device 10 by the entry conveyor belt 20, the forward meat-engaging section 36 of upper pressing conveyor belt 32 engages the top surface of the meat product 100 and continues to direct the meat product 100 into the interior of the device 10. Because the forward meat-engaging section 36 of belt 34 is angled, as shown in FIG. 2, and furthermore because the metal grating of belt 34 does not deform and belt 22 cannot deform due to the presence of metal plate 30 underneath the belt 22, the meat product 100 is compressed between belt 34 and belt 22. As will be shown, this compressing of the meat product 100 is important to the present invention as it prevents the meat product 100 from rotating during the cutting process. When the meat product 100 reaches the end of forward meat-engaging section 36 of belt 34, the meat product 100 has been compressed to its fullest extent by the device 10 of the present invention.

It should be noted at this time that the meat product 100 has been placed on entry conveyor belt 20 with the skin and fat adjacent the belt 22. When the meat product 100 then reaches the cutting section of the device 10 the device will work properly as the skin and fat are on the bottom of the meat product 100.

Figure 3A:
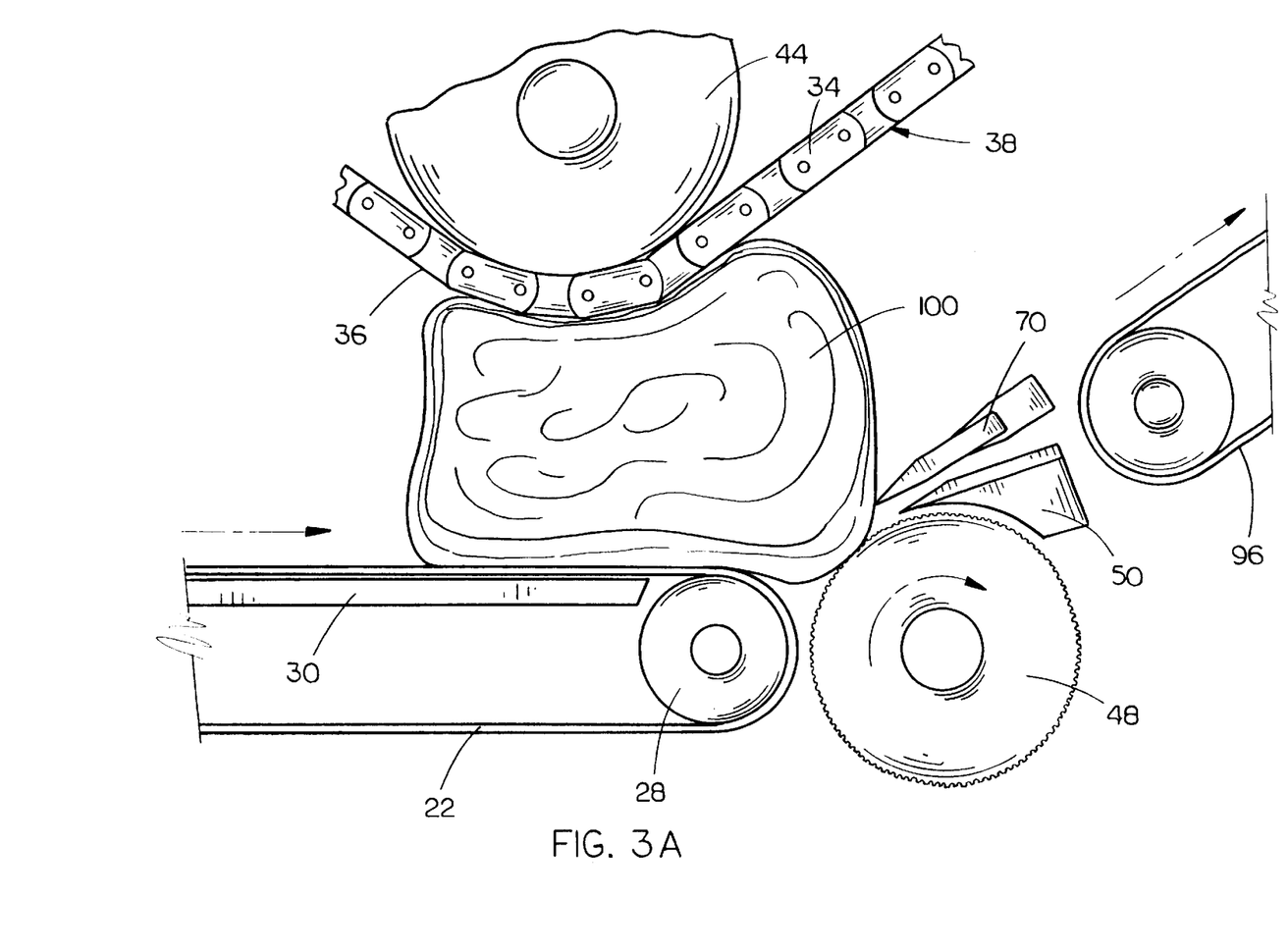
FIGS. 3a and 3b are detail side elevational views of the skin removal and fat trimming process showing the meat product being compressed and being forced into engagement with the skin removal and fat trimming blades.

The meat product 100 has now reached the end of entry conveyor belt 20 and is contacted by a rotating ridged metal (preferably stainless steel) cylinder 48 which is mounted on frame 12 adjacent the end of entry conveyor belt 20 near drive roller 28. The serrated teeth of the cylinder 48 engage the skin 102 of the meat product, as shown in FIG. 3a, and the cylinder 48 continues, assisted by belt 34 of upper pressing conveyor belt 32, to pull the meat product 100 through the device 10. As the meat product 100 is moved by the rotating ridged cylinder 48, the meat product 100 encounters the skin removal blade assembly 50 and fat removal blade assembly 70, as shown best in FIG. 3a. The blade assemblies themselves are best shown in FIGS. 4, 5 and 6.

Figure 3B:
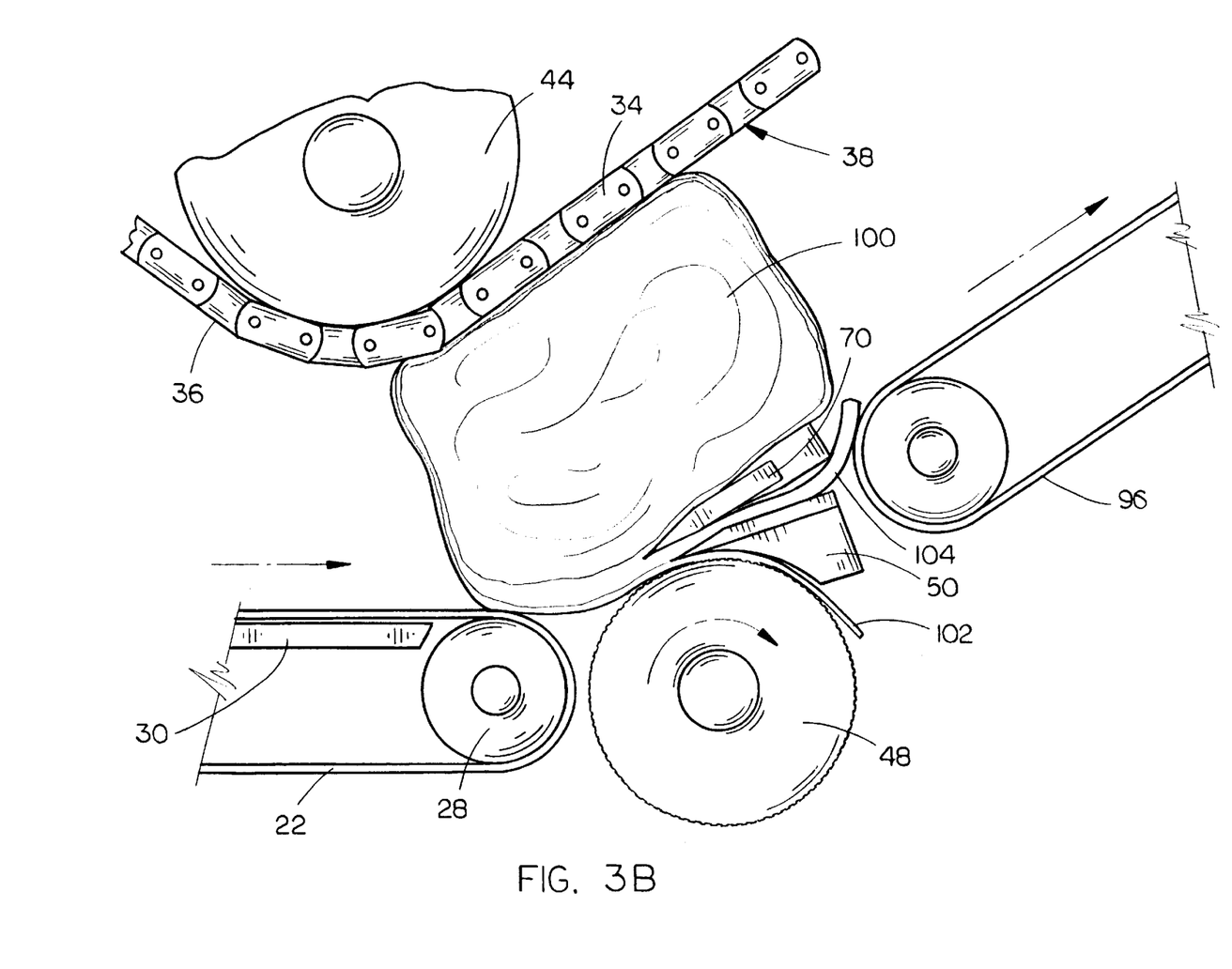
Figure 4:
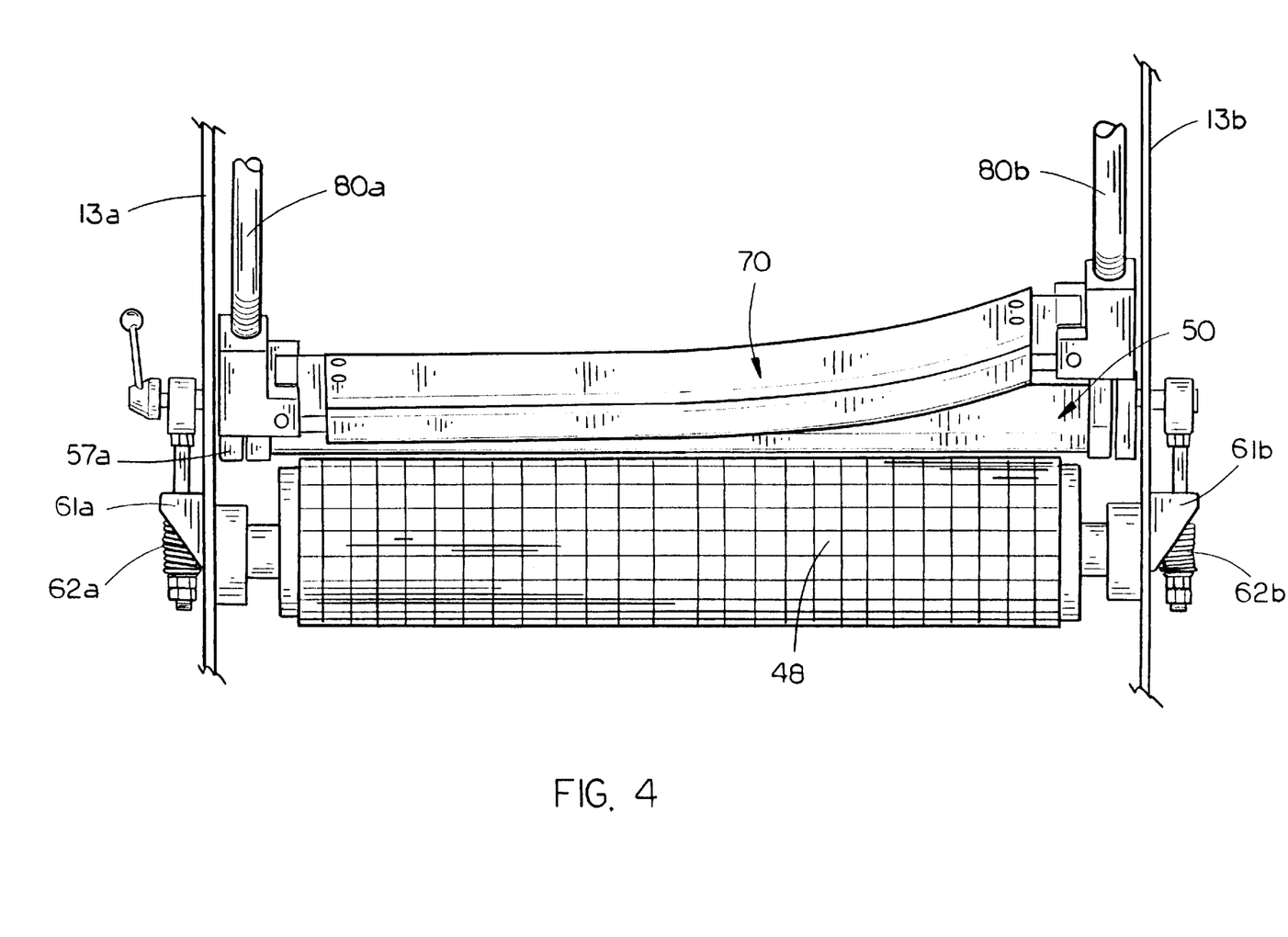
FIG. 4 is a front elevational view of the entry conveyor belt showing the skin removal and fat trimming blades positioned to the engage the meat product.
Figure 5:
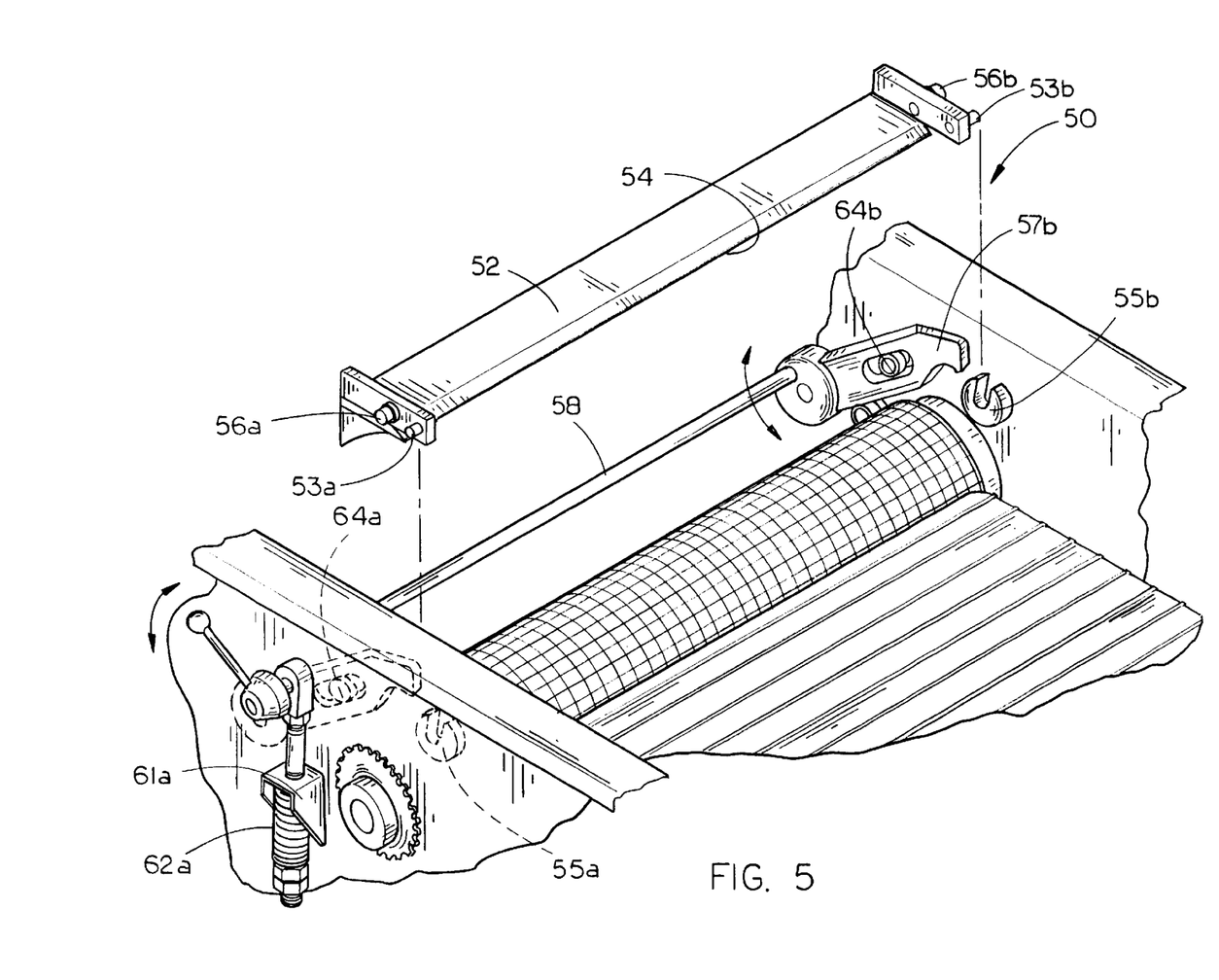
FIG. 5 is a detailed perspective view of the skin removal blade mount being removed from the device.

The skin removal blade assembly 50 is best shown in FIGS. 4 and 5 as including a metal blade holder 52 having mounting pins 53a and 53b on opposite ends thereof, the blade holder 52 operative to support a thin stainless steel blade 54 which extends from the front of blade holder 52. When the blade holder 52 is mounted in the automatic skin removal and fat trimming device 10, mounting pins 53a and 53b are slid into pin holding sockets 55a and 55b mounted on a portion of frame 12 and rearward securement pins 56a and 56b also mounted on opposite ends of blade holder 52 are engaged by a pair of pivoting pawls 57a and 57b (pawl 57b not being shown in FIG. 5 due to the angle of view) connected to one another by a bar 58. Bar 58 extends through mounting supports 13a and 13b of frame 12, as shown best in FIGS. 4 and 5, the bar 58 being rotatably mounted within opposite socket supports 60a and 60b. Each of the socket supports 60a and 60b are vertically movably mounted on socket support brackets 61a and 61b which are spring-loaded (see springs 62a and 62b) to permit vertical movement of the socket supports 60a and 60b in response to excessive force being applied to the blade holder 52. To permit rotation of bar 58, a handle 64 is affixed to one end thereof, as shown in FIG. 5. Rotation of the handle 64 results in rotation of the bar 58 which thus rotates pawls 57a and 57b about the pawl mounts 64a and 64b (not shown) thereby securing the blade holder 52 adjacent the rotating ridged cylinder 48. Rotation of bar 58 can either release the blade holder 52 from its mounting on the frame or will act to tilt the blade holder 52 slightly to remove a thicker or thinner section of skin from the meat product 100 as shown in FIGS. 3a and 3b. Finally, mounted on the underside of blade holder 52 are a plurality of vertical rakes 66, shown best in FIG. 6, which act to direct the skin 102 downwards and away from the meat product 100.

Figure 6:
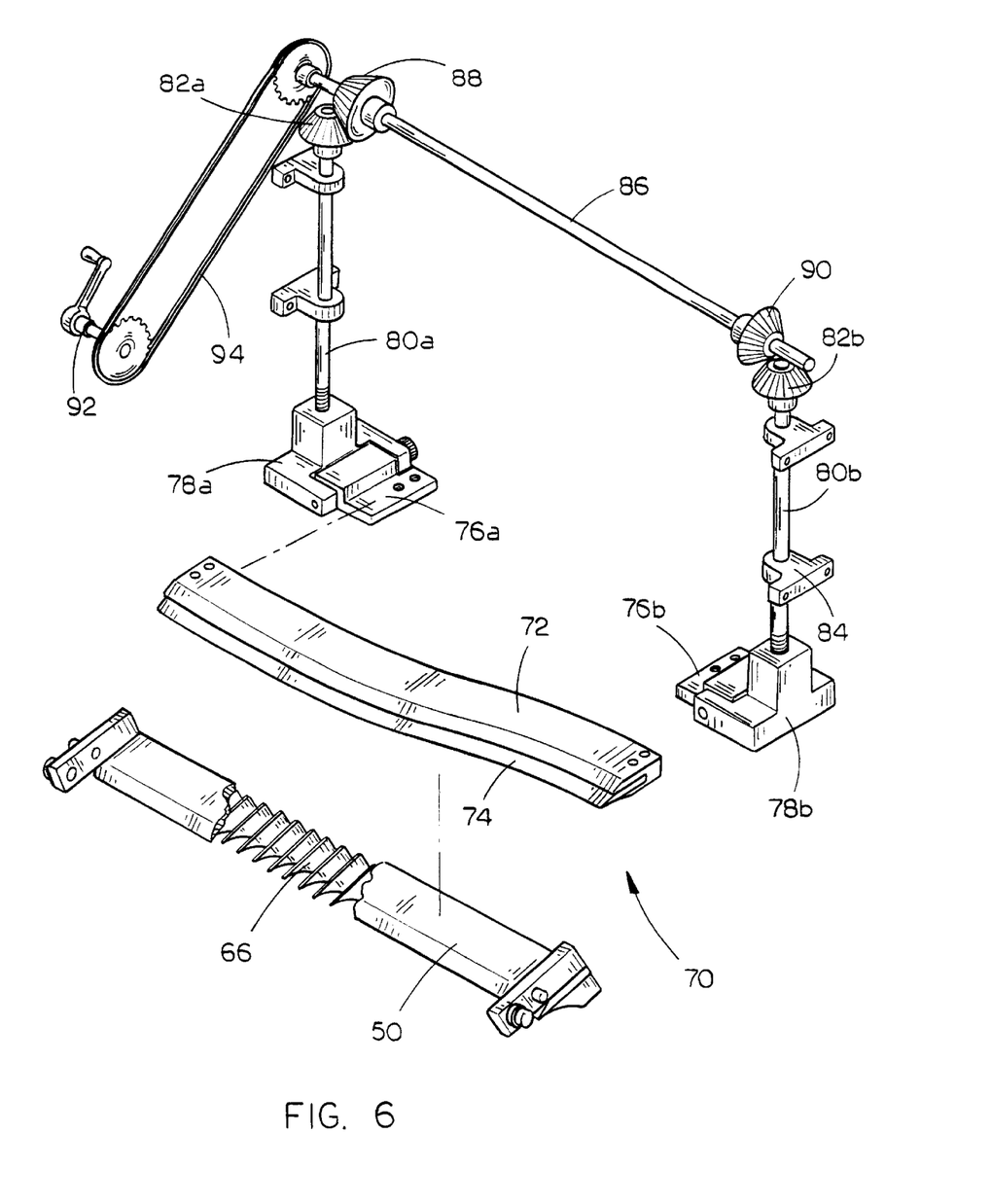
FIG. 6 is a partial detail perspective view of an embodiment of the mounting and adjustment device for the fat trimming blade shown mounted above the skin removal blade.

The fat removal blade assembly 70 is best shown FIGS. 4 and 6 as including a curved blade holder 72 which secures a thin stainless steel blade 74 therein. The blade holder 72 will preferably be mounted on left and right blade support blocks 76a and 76b which are each pivotably mounted to height adjustment blocks 78a and 78b as shown in FIG. 6. A pair of generally upright rotatably mounted threaded metal rods 80a and 80b extend into threaded holes formed in the tops of each of the adjustment blocks 78a and 78b. Mounted atop each metal rod is an offset gear 82a and 82b. The metal rods 80a and 80b are rotatably mounted by a plurality of rod supports 84. A rotatable adjustment control rod 86 extends generally horizontally between and above the metal rods 80a and 80b as shown in FIG. 6, and will preferably include a first offset gear 88 and a second offset gear 90 each mounted on adjustment control rod 86 to engage a respective one of the offset gears 82a and 82b. Rotation of adjustment control rod 86 may be accomplished via several different systems, but the present embodiment shown in FIG. 6 includes a crank handle 92 connected to adjustment control rod 86 by a belt 94 to allow for rotation of the adjustment control rod 86. A preferred feature of this design is that the first and second offset gears 88 and 90 may be of different ratios to permit the raising and lowering of the adjustment blocks 78a and 78b by differing amounts in response to rotation of the adjustment control rod 86. For example, in the preferred embodiment, the second offset gear 90 and first offset gear 88 would have a ratio of two to one so that the rightmost adjustment block 78a would raise twice as much as the leftmost adjustment block 78a in response to rotation of the adjustment control rod 86. Of course, many variations of adjustment systems may be applied to the present invention, but it is believed that the relatively simple mechanical characteristics of the above-described adjustment system are preferable, although the exact construction of such a simple mechanical adjustment system may be modified in many different ways.

FIGS. 3a, 3b and 4 show how the skin removal blade assembly 50 and fat removable blade assembly 70, specifically the blades 54 and 74, engage the meat product 100 and separate the skin 102 and fat 104 therefrom. In the preferred embodiment, the skinning blade 54 would be set at an angle of approximately 22 degrees from horizontal, although this angle may vary from 15 to 30 degrees, and the defatting blade 74 would be set at an angle of approximate 32 degrees from horizontal, varying from 25 to 40 degrees, with the skinning blade positioned slightly forward of the defatting blade as shown in FIGS. 3a, 3b and 4. Also, while the skinning blade is positioned substantially perpendicular to the direction of travel of the meat product 100, the defatting blade 74 would be angled slightly from perpendicular with the rightmost end of the blade holder 72, specifically the curved portion of the blade holder 72 would be set rearward slightly when compared to the left side of the blade holder 72. Of course, this is not a fundamentally necessary element of the present invention but has been found to improve operation of the automatic skin removal and fat trimming device 10. When the skin 102 of the meat product 100 is engaged by the rotating ridged cylinder 48, the meat product 100 is pulled rearwards within the device 10 and the forward edge of the meat product 100 contacts the skin removal blade 54 which begins to separate the skin from the remaining part of the meat product 100. Almost immediately thereafter, the forward edge of the meat product 100 encounters the fat removal blade 74 which begins to separate the fat 104 from the meat product 100, as shown in FIG. 3. The skin removal blade assembly 50 is designed to separate the skin 102 from the meat product 100 and then direct the skin 102 downwards and away from the meat product 100 (due to the operation of rakes 66) so that the skin 102 is separated and removed from the meat product 100. As the fat 104 is separated from the meat product 100, as shown in FIG. 3b, on the other hand, it is desirable to have the fat 104 remain with the meat product 100, although separated therefrom, and so fat removing blade holder 72 is designed to permit the fat 104, after separation, to be engaged by a rear meat discharge belt 96 which, after processing the meat product 100, discharges the meat product 100 and fat 104 from the rear of the machine. The rear discharge belt 96 is constructed almost identically to entry conveyor belt 20 and is preferably tilted upwards as shown in FIG. 2 to remove the meat product 100 from the device 10 in a position ready for further processing thereof and to facilitate cooperation of the rear discharge belt 96 and the rearward meat-engaging section 38 of upper pressing conveyor belt 32.

It is important to note that the compression of meat product 100 between upper pressing conveyor belt 32, ridged cylinder 48, and rear meat discharge belt 96 acts to accurately transport the meat product 100 through the device 10 while not permitting rotation of meat product 100 upon encountering skin removal blade 54 or fat removal blade 74 which is a common problem found in the prior art. The rearward meat-engaging section 38 of upper pressing conveyor belt 32 cooperates with rear meat discharge belt 96 in much the same fashion as was previously described in connection with cooperation of the forward meat-engaging section 36 and entry conveyor belt 20 and acts to accurately and efficiently convey the meat product 100 through the device 10.

Following processing of the meat product 100, the meat product 100 and fat 104 are transported up the rear meat discharge belt 96 to a waiting operator of device 10, whereas the skin 102 is discharged from the lower rear of the device 10 for further processing such as the making of pork rinds or the like.

Figure 7:
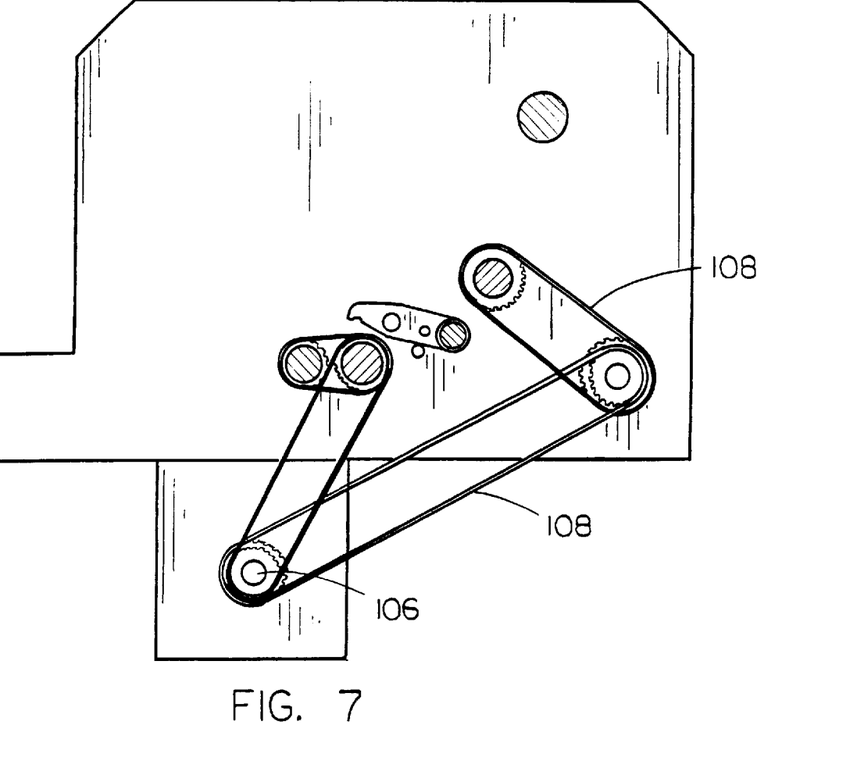
FIGS. 7 and 8 illustrate one variation of the belt and chain connection and the drive motor for driving the various belts and cylinders within the automatic skin removal and fat trimming device.
Figure 8:
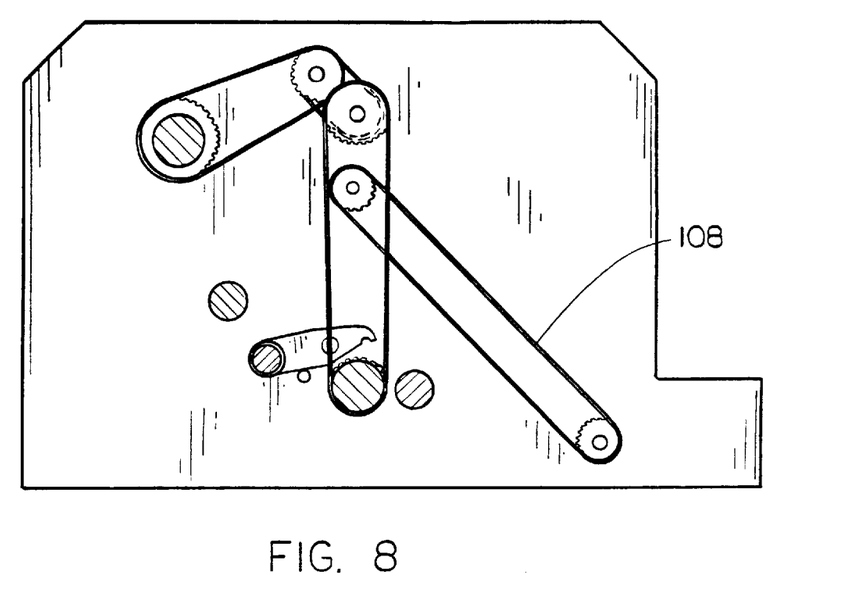

FIGS. 7 and 8 disclose one variation of drive connection system which permits each of the conveyor belts 20, 32 and 96, to be driven by a single motor mounted in the lower section of the frame 12. It is preferred that the drive motor (not shown) have a shaft which drives a drive gear 106, the drive motor being of sufficient power to drive each of the belts 108 which are connected to the drive gear 106 (both directly and indirectly) and also the rotating ridged cylinder 48 in order to efficiently operate the present invention. Of course, numerous variations of the drive system shown in FIGS. 7 and 8 may be used with the present invention and it shall be further understood that so long as each of the driven elements receives the correct driving force, the actual mechanism by which that driving force is delivered is not critical to the present invention.

The discharge of the skin 102 from the device 10 may also be accomplished by a rear skin discharge belt 98 or the skin 102 may simply be allowed to fall to the base of the device 10 for removal and further processing thereof. Again, the skin 102 would commonly be used for the production of pork rinds or the like.

It is to be understood that numerous modifications, substitutions, and additions may be made to the automatic skin removal and fat trimming device 10 of the present invention which fall within the intended broad scope of the appended claims. For example, it may be desirable to slightly modify the orientation of the various belts and cylinders to facilitate the processing of different types of meat products which is permissible provided that the compression of the meat product prior to blade engagement still takes place. Also, the blade holding assemblies may be modified or changed so long as the intended purpose of supporting the blade in a meat product engaging position is maintained. Finally, the dimensions and construction materials used in the manufacturing of the present invention may be modified without affecting the scope of desired protection.

There has thus been shown and described an automatic skin removal and fat trimming device which accomplishes at least all of the stated objectives.

What is claimed is:

1. An automatic skin removal and fat trimming device for meat products comprises:

a frame having forward and rearward ends;

an entry conveyor belt means having forward and rearward ends mounted on said frame adjacent said forward end of the frame for receiving a meat product thereon and transporting it into said device;

an upper pressing conveyor belt means having forward and rearward sections, said upper pressing conveyor belt means mounted on said frame above said entry conveyor belt means, said forward section of said upper pressing conveyor belt means angled relative to said entry conveyor belt means such that when a meat product on said entry conveyor belt means is transported into said device, the meat product is compressed between said entry conveyor belt means and said forward section of said upper pressing conveyor belt means;

a rotating ridged cylinder mounted on said frame adjacent said rearward end of said entry conveyor belt means, said cylinder operative to frictionally engage the skin of the meat product to further direct the meat product through the device;

a skin removal blade mounted on said frame adjacent said rearward end of said entry conveyor belt means slightly above the plane of said entry conveyor belt means such that as the meat product is moved past said skin removal blade, the skin on the meat product is removed and separated from the remainder of the meat product;

a curved fat trimming blade having opposite ends, said curved fat trimming blade mounted on said frame and positioned above said skin trimming blade and spaced therefrom to engage, cut and remove the fat lining surrounding the meat on the meat product, said fat trimming blade including an arcuate section interposed between said opposite ends, said arcuate section operative to allow said fat trimming blade to more accurately remove fat from meat products;

a meat removing conveyor belt means mounted rearwardly of said skin removal and fat trimming blades operative to engage the meat product and pull the meat product towards the rearward end of the frame thereby removing the meat product from the trimming device;

said rearward section of said upper pressing conveyor belt means cooperating with said meat removing conveyor belt means to compress and pull the meat product through and out of said device; and a drive device operatively connected to said entry conveyor belt means, said upper pressing conveyor belt means, said meat removing conveyor belt means and said rotating ridged cylinder to drive each of said conveyor belts and said cylinder to pull the meat product through the device and efficiently separate the skin and fat from the meat product.

2. The automatic skin removal and fat trimming device of claim 1 wherein said entry conveyor belt means comprises a forward roller and a drive roller rotatably mounted on said frame, said rollers supporting said belt in a generally horizontal position, said entry conveyor belt means being supported by a generally flat, generally horizontal plate mounted on said frame directly underneath said belt in order to prevent the deformation of said belt when a meat product is placed thereon.

3. The automatic skin removal and fat trimming device of claim 1 wherein said upper pressing conveyor belt means comprises said belt being constructed of metal grate, said belt being supported in a generally triangular cross-sectional shape having a lower corner generally adjacent said entry conveyor belt means, said upper pressing conveyor belt means supported by at least three rollers, a forward roller, lower roller and a drive roller.

4. The automatic skin removal and fat trimming device of claim 1 wherein said skin removal blade is adjustably mounted on said frame adjacent said rotating ridged cylinder wherein the thickness of skin removed from the meat product is adjustable, said skin removal blade set at an angle between 15 and 30 degrees from horizontal to engage the meat product and remove the skin from the meat product.

5. The automatic skin removal and fat trimming device of claim 4 wherein said curved fat trimming blade is adjustably mounted on said frame above said skin removal blade, said blade set at an angle between 25 and 40 degrees from horizontal, said skin removal blade being positioned slightly forward of said curved fat trimming blade, said skin removal blade positioned substantially perpendicular to the direction of travel of the meat product, said curved fat trimming blade angled slightly from perpendicular such that the curved portion of said curved fat trimming blade is set rearward slightly from said skin removal blade.

6. The automatic skin removal and fat trimming device of claim 1 wherein said meat removing conveyor belt means is tilted upwards to remove the meat product from said device in a position ready for further processing thereof.

7. The automatic skin removal and fat trimming device of claim 1 wherein said drive means comprises a drive motor operatively connected to each of said entry conveyor belt means, said upper pressing conveyor belt means, said meat removing conveyor belt means and said rotating ridged cylinder whereby said belts are operated at substantially the same rotational speed.

* * * * *